(12) United States Patent
Henningsson et al.

(10) Patent No.: US 6,170,551 B1
(45) Date of Patent: Jan. 9, 2001

(54) APPARATUS FOR SCREENING OFF LARGE SURFACES, FOR EXAMPLE GLASS SURFACES OR THE LIKE AND A METHOD OF INSTALLING SUCH SCREENS

(75) Inventors: Göran Henningsson; Hans Andersson, both of Kinna (SE)

(73) Assignee: Ludvig Svensson International BV, Hellevoetsluis (NL)

( * ) Notice: Under 35 U.S.C. 154(b), the term of this patent shall be extended for 0 days.

(21) Appl. No.: 09/125,611
(22) PCT Filed: Feb. 24, 1997
(86) PCT No.: PCT/SE97/00309
§ 371 Date: Aug. 21, 1998
§ 102(e) Date: Aug. 21, 1998
(87) PCT Pub. No.: WO97/30578
PCT Pub. Date: Aug. 28, 1997

(30) Foreign Application Priority Data

Feb. 23, 1996 (SE) .................................................. 9600675
May 21, 1996 (SE) .................................................. 9601911

(51) Int. Cl.[7] .................................................. A47H 5/00
(52) U.S. Cl. .................................. 160/84.06; 47/17; 52/63
(58) Field of Search .............................. 160/84.06, 352, 160/84.01; 47/17, 28.1, 31; 52/63

(56) References Cited

U.S. PATENT DOCUMENTS 1,899,062 * 2/1933 Steffen .............................. 160/84.06
3,418,752 * 12/1968 Stratton .................................. 47/28.1
5,451,445 * 9/1995 Wang ........................................ 47/31
5,761,776 * 6/1998 Vollbregt .
5,809,701 * 9/1998 Vollebregt ......................... 160/84.06

FOREIGN PATENT DOCUMENTS

2254273 * 7/1975 (FR) ........................................ 47/31
9402522-8A 7/1994 (SE) .
WO 92/12621 8/1992 (WO) .

* cited by examiner

Primary Examiner—Blair M. Johnson
(74) Attorney, Agent, or Firm—Woodbridge & Associates, P.C.; Richard C. Woodridge

(57) ABSTRACT

An apparatus for screening off large surfaces, for instance glass surfaces, growing surfaces or the like and a method of assembling such apparatus for screening off is described. The apparatus includes at least one curtain (14), for example a greenhouse curtain, which is held up by a number of support lines (12) along which the curtain is mobile for opening or closing it. The curtain includes a number of suspension lines (26) integrated in the curtain across the support lines (12), which suspension lines (26) are freely mobile along the length of the curtain. The support lines (12) can be coupled together by one or several of the suspension lines (26) via connectors. At least some of the suspension lines (26) integrated in the curtain (14) are stretched between at least some of the support lines (12). When stretched the suspension lines (26) are freely mobile in the curtain and in the said connectors (15) and at least some of the connectors (15) are attachable to the suspension lines (26).

15 Claims, 7 Drawing Sheets

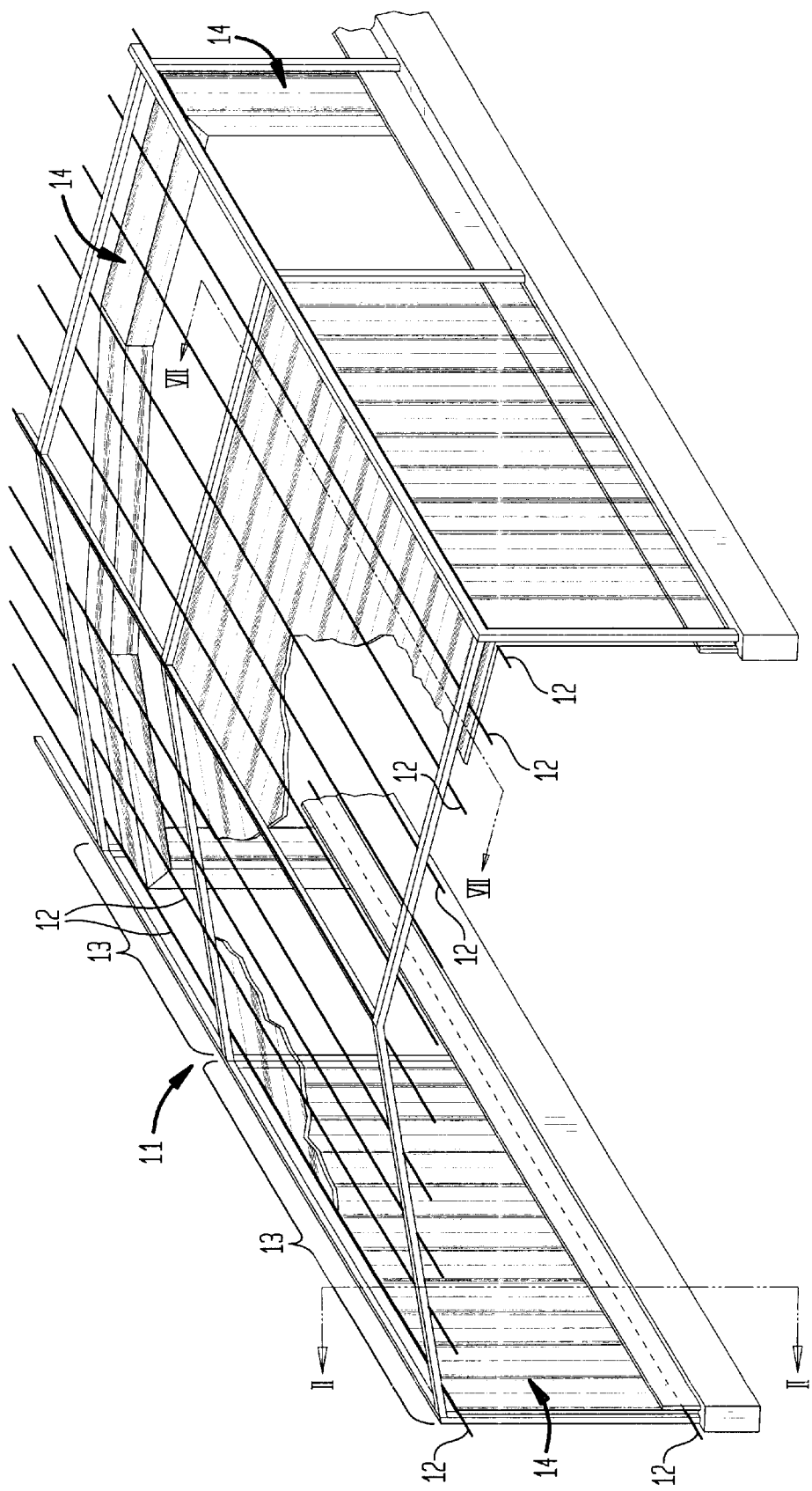

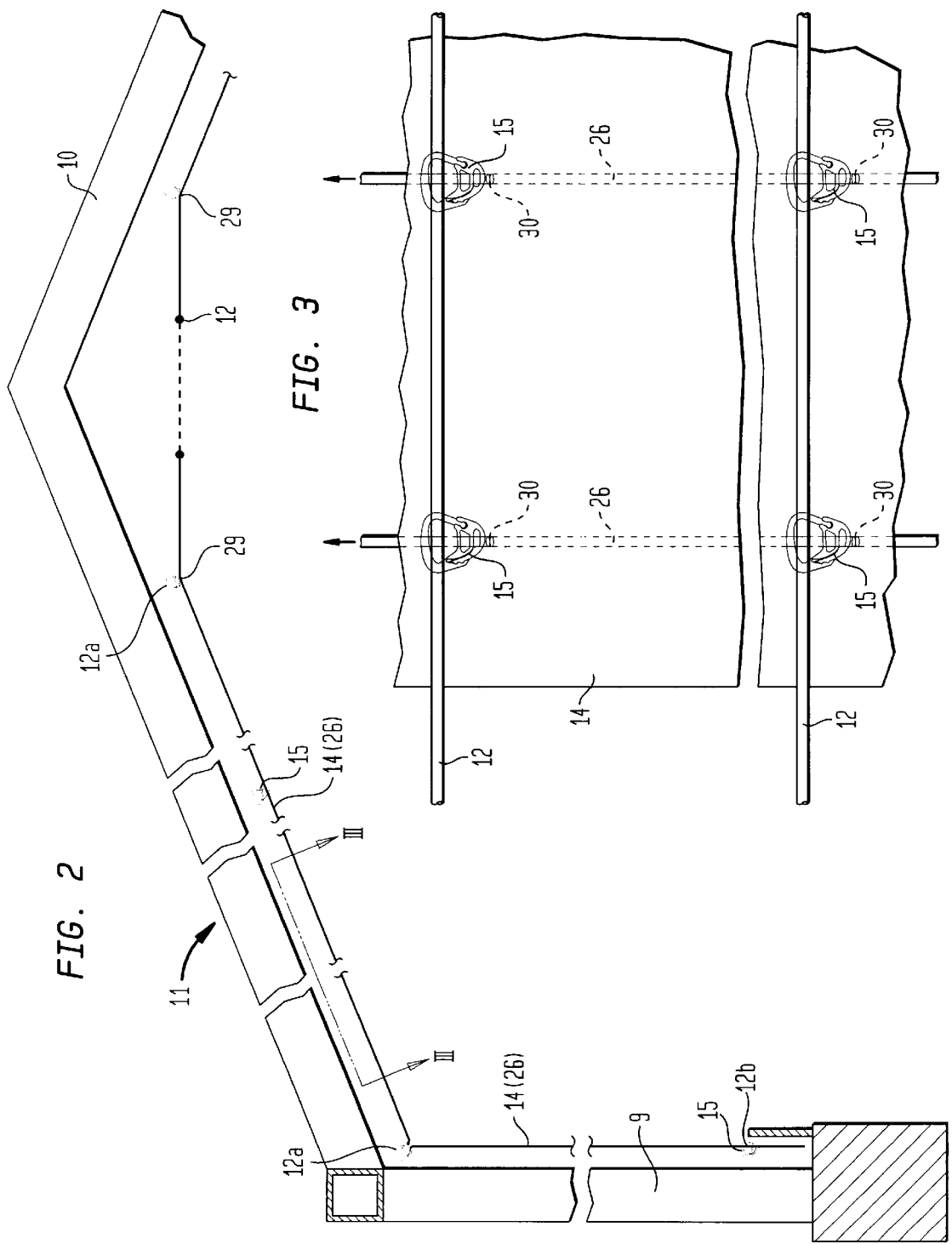

APPARATUS FOR SCREENING OFF LARGE SURFACES, FOR EXAMPLE GLASS SURFACES OR THE LIKE AND A METHOD OF INSTALLING SUCH SCREENS

The present invention concerns an apparatus for screening off large surfaces, for instance glass surfaces, growing surfaces or the like including at least one curtain, specifically a greenhouse curtain, held up by a number of support lines along which the curtain is mobile for opening or closing the curtain which includes a number of suspension lines integrated in the curtain across the support lines. The suspension lines are freely mobile along the length of the curtain and the support lines can be coupled together with at least one or several of the suspension lines using connectors. The invention also concerns a method of assembling such an apparatus for screening.

THE BACKGROUND OF THE INVENTION

Conventional greenhouse curtains, also called shade curtains, are hung under or draped over support lines which are stretched along the length of the greenhouse near the glass roof. A relatively large number of support lines is needed, typical distances between them being about half a meter, which leads to high installation costs, long installation times, reduced illumination and a greenhouse construction strong enough to bear the load of a large number of steel wires or lines, especially when it comes to large greenhouses. For example 50×100 m is not unusual.

The reason that the support lines are at such a short distance from each other is that the greenhouse curtains are too weak to include support hooks in the cloth itself. Otherwise they are pulled out by wind gusts through the airing openings when they are open. Until now this problem has been alleviated by sewing a strip along the top of the curtain along the support lines, that is, along the breadth of the curtain. Another alternative is to glue a reinforcing tape there instead of the sewn on strip. There are also variants where the material has been made thicker in the area where the hooks are to be attached to better withstand external forces. None of these alternatives is optimal and all of them cost time and money and have limited strength in the environment in which they are used.

Through WO 92/12621 a greenhouse curtain is already known that is reinforced at regular intervals along its length with strips integrated in the material to which strips support hooks are attached. Because the material must not hang down between the support lines, only an unimportant sag being tolerable, the distance between the support lines cannot be increased in spite of the reinforcing strips.

Another problem is the unavoidable shrinkage of the cloth along its length even if the cloth has been shrunk during production. A greenhouse cloth can be up to 100 meters long and even if the shrinkage is as little as 0.5% it amounts to 0.5 meter which is enough to prevent the construction from working properly as the majority of the hooks that are attached to the cloth are pulled out when the shrinkage begins.

In this context it is also important that the package that is formed when the curtain is pulled aside is as narrow as possible. A large baggy package steals light and gives a bad impression.

Through SE-A-9402522-8 a plant protection construction for outdoor use is also known, that is, plant protection curtains not for greenhouses, which in contrast to greenhouse curtains must be water tight. To divert rain water the support lines are stretched between guides attached to longitudinal beams via carriers and the plant protection curtain is arranged to form sloping channels between the suspension lines. The support and the suspension lines are there mainly to prevent the formation of water pockets which can make the whole construction collapse.

THE PURPOSE OF THE INVENTION AND ITS MOST IMPORTANT CHARACTERISTICS

The purpose of the present invention is to eliminate the above disadvantages, that is to reduce the number of support lines in greenhouses, to reinforce the support points in the curtain cloth without extra work, to eliminate the problem of shrinkage along the length of the cloth, to reduce the size of the package when the curtain is drawn aside, and to significantly reduce the amount of work required to assemble the support lines and attach the curtains.

These disadvantages in connection with apparatus for screening have been eliminated by stretching at least some of the suspension lines integrated in the curtain between at least some of the support lines, by making the suspension lines freely mobile in the curtain and the connectors during the stretching and making it possible to affix at least some of the connectors to the suspension lines. Another purpose of the invention is to simplify assembly of the screening apparatus. This has been achieved by attaching the connectors to the suspension lines integrated in the curtain so that they are mobile relative to the connectors, by hanging the curtains using connectors in the support lines or by placing them on the support lines with connectors attached to them and by stretching the suspension lines between at least two of the support lines and affixing them as stretched to at least some of the connectors.

DESCRIPTION OF THE DRAWINGS

The inventions will be described in greater detail and exemplified in the following with reference to the attached drawings.

FIG. 1 shows schematically in perspective part of a greenhouse with a first curtain section in closed position and with a second curtain section in open position in an adjacent section.

FIG. 2 shows a section according to the line II—II in FIG. 1 on a larger scale.

FIG. 3 shows a top view of a greenhouse curtain along the line III—III in FIG. 2 on an even larger scale.

DESCRIPTION OF EXEMPLIFICATIONS

Figure 4:
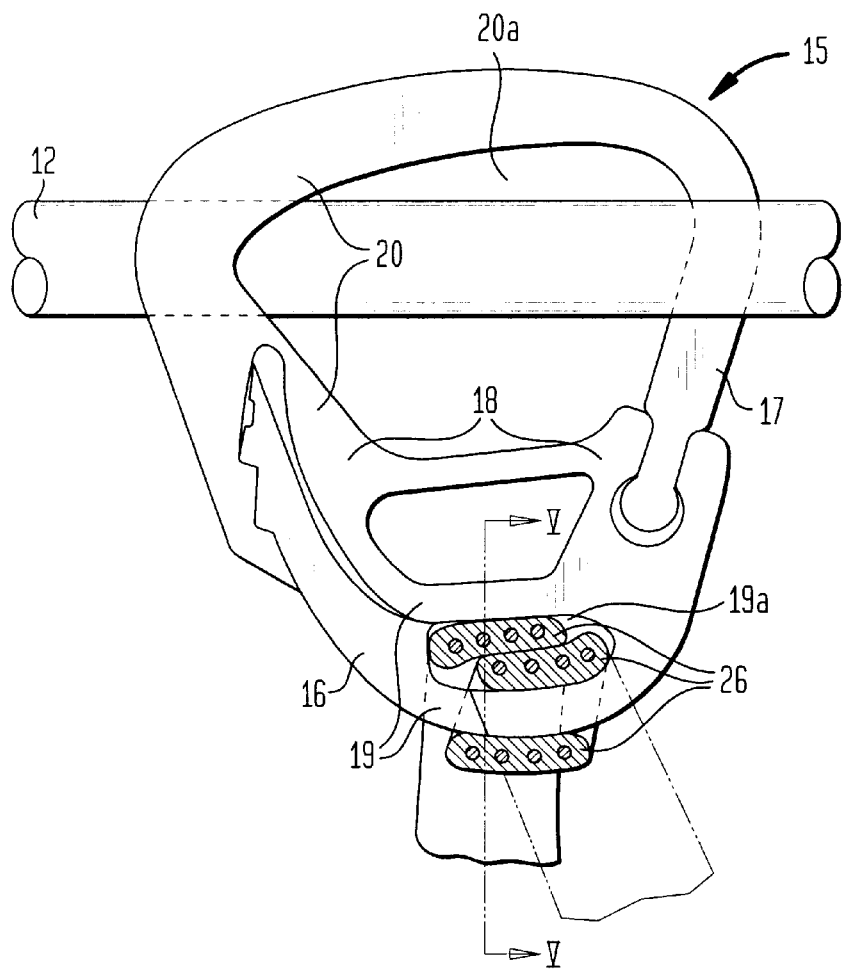
FIG. 4 shows an example of a connector with an attached doubled suspension line suspended from a support line on a scale larger than reality.

FIG. 1 shows an example of a greenhouse excluding glass components but with support lines 12 under the glass roof and along the walls, which support lines 12 are stretched between the ends of the greenhouse (not shown) or between other parts such as between the roof trusses 10 and the wall posts 9. The greenhouse is divided into sections 13 corresponding to the maximum width of a greenhouse curtain 14. The length of the curtain is thus oriented across the length of the greenhouse. In a known way the curtain 14 is supported via connectors 15 by support lines 12 as shown in FIG. 2. According to the exemplification shown in FIG. 6 the greenhouse curtain 14 consists of a large number of narrow foil strips 21 or the like of a yarn framework 22 produced according to a weaving or crocheting method. In the latter case the yarn framework contains longitudinal and transverse connecting lines 23 and 24, 25 which prevent the foil strips from being pulled out of the curtain.

The foil strips 21 can be transparent, semi-transparent, light absorbing, light reflecting, etc, and/or a combination of these and they can also be partly lacking, forming open stretches through which air can pass. At regular intervals, for example 20–40 cm, the foil strips are furnished with or replaced by suspension lines 26, the width of which is the same as or somewhat less than the width of the foil strips. The suspension lines are integrated in the yarn framework so that they can be moved along their length when they are subjected to a pulling force. The suspension lines 26 are to take up and distribute the forces from the connectors 15 along a part of the curtain. The connectors 15 are appropriately attached to the curtain by affixing them around the suspension lines. The material in them must have high tensile strength and low elasticity and appropriately consists of low density polyethylene reinforced with threads 27 of polyester, metal or the like. It is advantageous that the suspension lines have a flat cross section.

The connector 15, known previously from WO 92/12621, consists of an essentially S-shaped hook where both free legs 16 and 17 are elastically bendable from an open position to to a closed position connected to the middle part 18 of the connector in which the legs 16, 17 form closed loops 19, 20. The curtain 14 is attached to the loop hole 19a and the support line 12 is attached to loop hole 20a. The inner cross section of the loop 19 is enough larger than the cross section of the suspension line 26 that it can move freely in the loop, it being large enough to accommodate an additional part of the suspension line.

Figure 5:
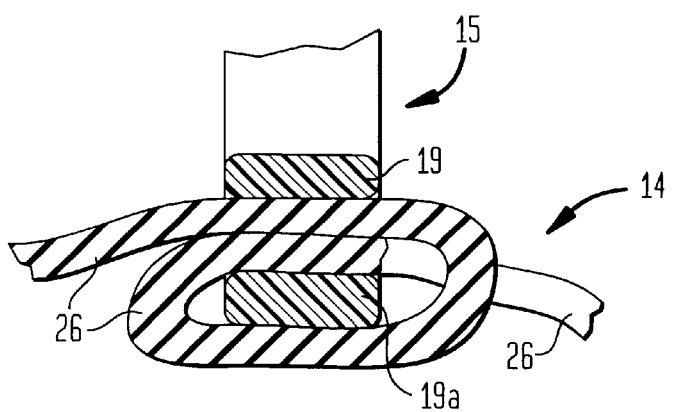
FIG. 5 shows a section along the line V—V in FIG. 4.
Figure 6:
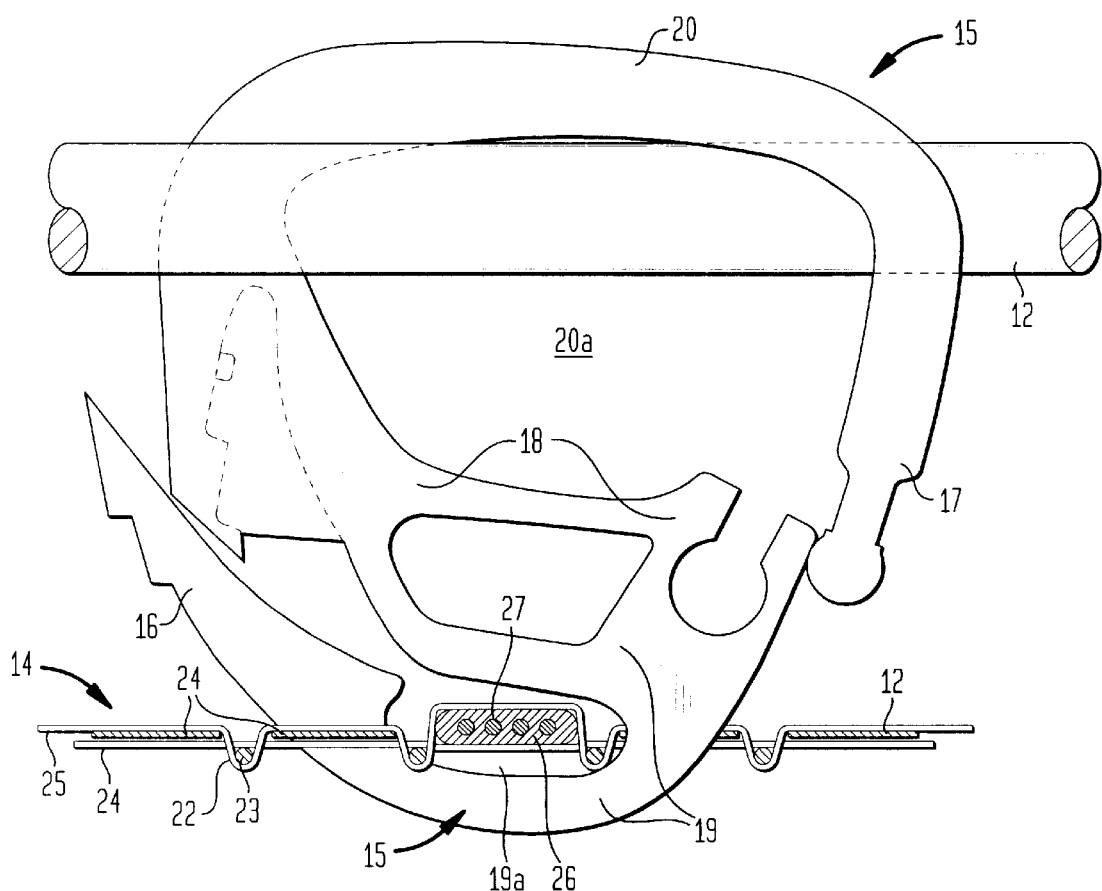
FIG. 6 shows schematically a section through a part of the curtain with an example of an attached open connector.

Before hanging up the curtain the connectors 15 are hooked around the suspension lines 26 integrated in the curtain at a distance of 40 cm for example, as shown in FIG. 6, whereby after closing the loop 19 there is enough room in the loop 19 to allow the suspension line to move along the curtain. By opening the loop 20 the hooks 15 and the attached curtain can be hung on the support lines 12a, 12b on the roof and walls, after which the loop is closed. The purpose of the support lines 12b and possibly some of the roof support lines 12a is to stretch the curtain. This is achieved by stretching the suspension lines manually or using a lever mechanism so that they form relatively straight "lines" between the hooks. The stretched suspension lines 26 are affixed to the attached connectors 15 on the support line 12b for example by winding the suspension line at least a whole turn around the leg 16 of the hook so that the loop 19 holds two turns of the suspension line, as shown in FIG. 4 and 5. The loop hole 19a in the loop 19 is dimensioned in relation to the double cross section of the suspension line so that it is compressed when the loop 19 is closed, which is sufficient to affix the hook relative to the suspension line.

Figure 10:
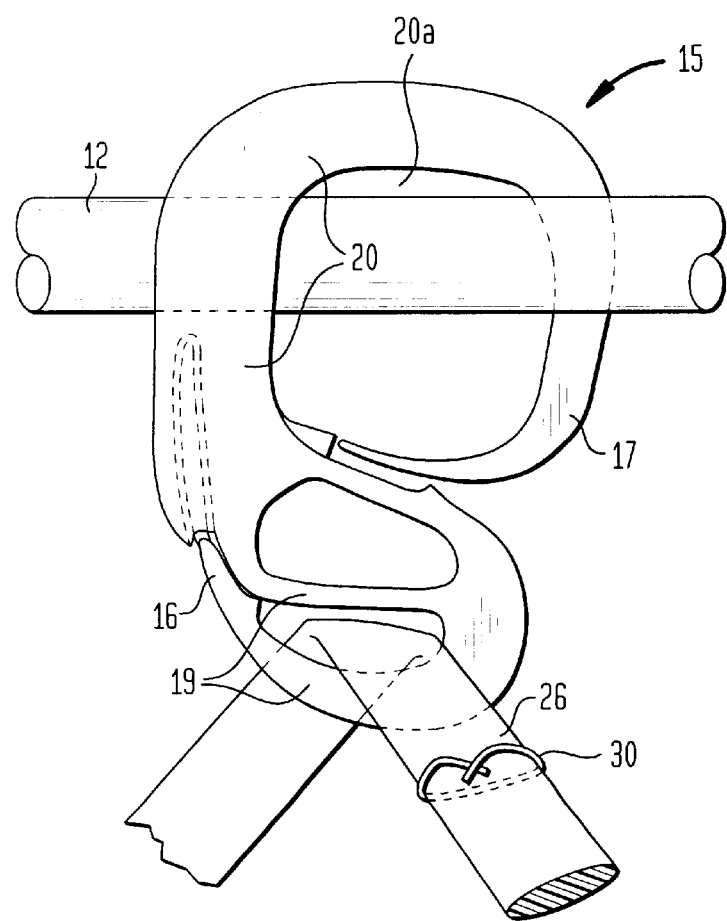
FIG. 10 shows an example of a connector with an attached single suspension line and a stop device of another embodiment.

Other types of connectors that achieve fixation in ways other than winding the line around the hook and pinning it in the loop are possible, of course. An alternative is shown in FIG. 3 and FIG. 10, where the loop 19 in the hook 15 is dimensioned so that the suspension line 26 can move freely along the line, which is necessary when hanging up the curtain so that it hangs in the right position. The suspension lines of the thus hung up curtains 14 are then stretched, appropriately section by section between the break points 29, whereafter the hooks 15, or at least those at the said break points, are affixed to the suspension lines 26 so that they can take up the stretch forces. The attachment must be done from inside the greenhouse because its glass parts make attachment from outside impossible. Further it is advantageous if the hooks 15 have a certain mobility, that is, are not absolutely affixed to the suspension lines 26 but still are flexibly attached in a direction which makes the connection to the greenhouse configuration better and softer. According to the invention this has been achieved by pinning a stop 30 to the stretched suspension line 26 directly after the hook 15 along the length of the stretched line, as indicated in FIG. 3 by arrows. The stop 30 is a metal clip which is bent around and absolutely fixed to the suspension line using a special plier. Pinning the clip can be done quickly and simply from inside the greenhouse. The clip can easily be removed if necessary by cutting off the clip, for example if restretching is needed. The stop 30 also can be a knot or other immovably to the suspension line 26 affixed device.

Figure 8:
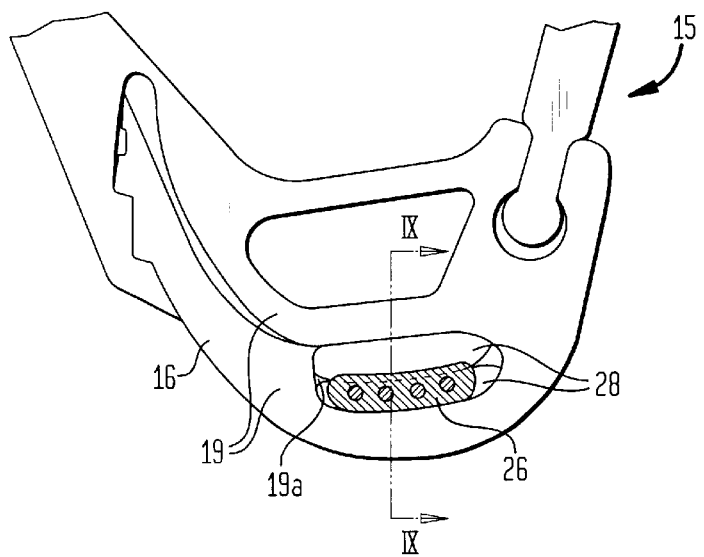
FIG. 8 shows a part of a connector of an alternative type.
Figure 7:
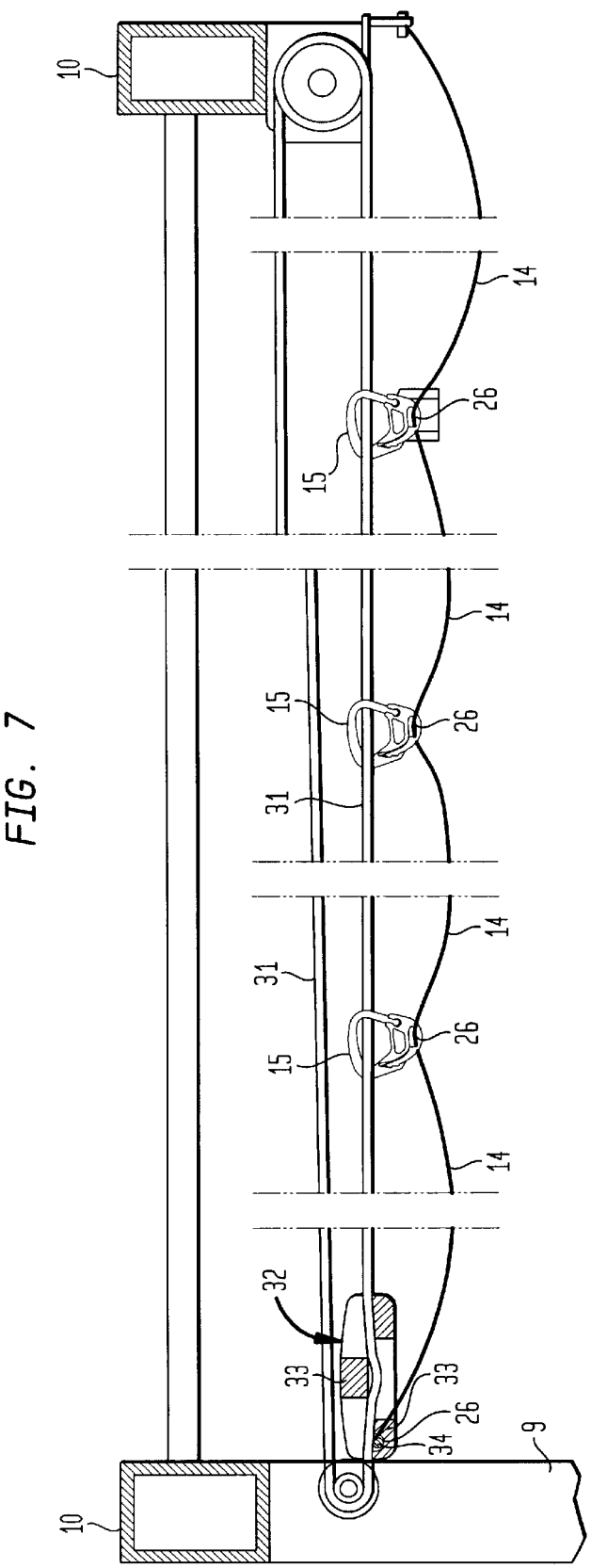
FIG. 7 shows a section along the line VII—VII in FIG. 1 through a section of the curtain between two roof trusses opposite a support line functioning as a pulling line.
Figure 9:
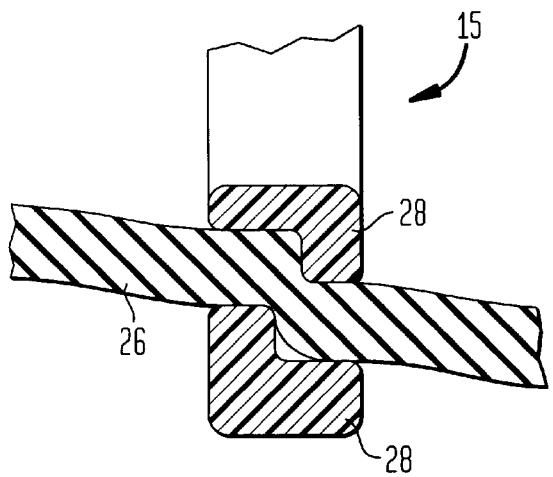
FIG. 9 shows a section along the line IX—IX in FIG. 8.

Another alternative is shown in FIGS. 8 and 9 where the loop hole 19a of the openable loop 19 consists of two pinning shoes 28 working against each other and which pin the suspension line 26 when the loop is in its closed position. In that case two different types of connectors are needed, one that allows the suspension line to move freely along its length and one that affixes the line.

Figure 11A:
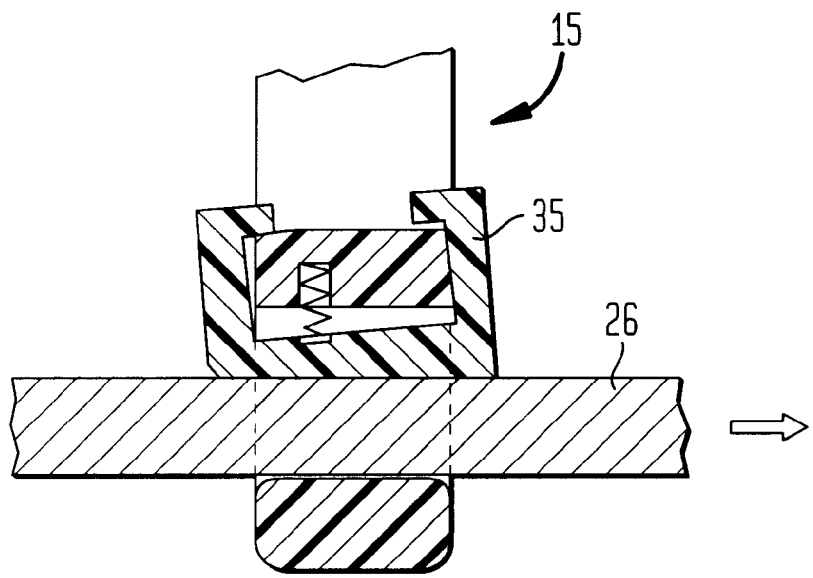
FIGS. 11a–11b show an example of a self-locking element.
Figure 11B:
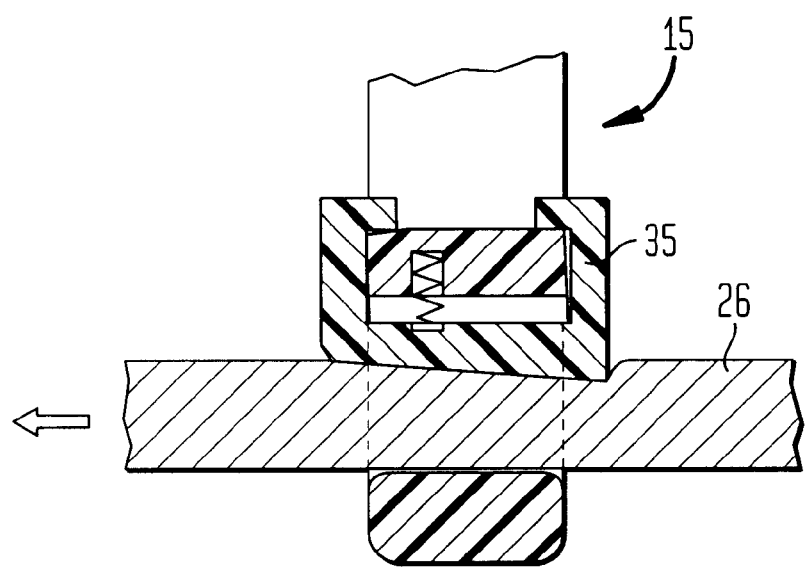

If the suspension line 26 is sufficiently flexible it can also be attached to the connector 15. Further possible alternative connectors can be made using known self locking elements, for example in the form of chunks or the like, which lock the line when pulled in one direction and free it when pulled in the opposite direction, as shown in FIGS. 11a and 11b. It is important that the connectors be very narrow and not take up more space along the length of the support lines than at most 3–4 mm. This is important as the thickness of the hooks determines the thickness of the folded curtain packet, which steals light unnecessarily if it is too wide.

The suspension lines 26 integrated in the curtain 14 need not be kept stretched significantly, only so much as to keep the curtain essentially flat and prevent its hanging down in folds. This means that hooks 15 can be used instead of rollers as no high friction results between them and the support lines when the curtain is to be opened or closed.

The stretch of the suspension lines 26 and their ability to distribute force along their whole length and thus over larger portions of the curtains gives them the advantage that the number of support lines can be reduced dramatically, from a previous distance of 0.5 m to 1.0–3.5 m, which leads to increased illumination, lower cost, lower load on the greenhouse construction, simpler installation and a considerably longer curtain lifetime.

The problem of the shrinkage of the curtain material has been solved because on stretching the curtain material can move relative to the integrated suspension lines and because there is so much "extra" material between the hooks that the necessary shrinkage compensation can be provided by that extra material.

In some greenhouses it happens that some or perhaps even all the support lines are in horizontal plane and that the curtain is placed on top of the support lines as shown in FIG. 2 instead of hanging on hooks under them. Also in these cases the suspension lines are stretched in accordance with the above described method. If the distance between break points 29 where the curtain changes direction, for instance from vertical to sloping to horizontal, is very large it can be advantageous to connect the suspension lines 26 to the hooks that are attached to the support lines at those break points.

The use of stretched suspension lines 26 integrated in the curtain 14 also has the advantage that the relatively heavy pulling gear at one end of the curtain, which opens and closes the curtain, can be simplified considerably. According to the invention a cross fastener 32 that can be pinned to the pulling line with a simple manipulation is coupled to the support lines 12 that function as pulling lines 31. This is accomplished by forming the cross fastener with steering surfaces 33 arranged so that the pulling line 31 is lead through the cross fastener non-linearly. Transverse to the pulling line the cross fastener has a groove 34 in which the suspension line 26 and parts of the curtain 14 are attachable. Most appropriately the groove is placed so that the pulling line 31 prevents the suspension line from leaving the groove.

| List of reference numbers | |
|---|---|
| 9 | wall posts |
| 10 | roof truss |
| 11 | greenhouse |
| 12 | Support lines |
| 12a | support lines in the roof |
| 12b | support lines along the walls |
| 13 | sections |
| 14 | greenhouse curtain |
| 15 | connectors = hooks |
| 16 | first leg |
| 17 | second leg |
| 18 | middle part |
| 19 | loop |
| 19a | loop hole 19 |
| 20 | loop |
| 20a | loop hole 20 |
| 21 | foil strips |
| 22 | yarn framework |
| 23 | longitudinal connecting lines |
| 24, 25 | transverse connecting lines |
| 26 | suspension lines |
| 27 | reinforcing lines |
| 28 | pinning shoes |
| 29 | break points |
| 30 | stops |
| 31 | pulling lines |
| 32 | cross connection |
| 33 | steering surfaces |
| 34 | grooves |

What is claimed is:

1. An apparatus for screening off large surfaces, comprising:
   (a) at least one curtain (14) having a number of suspension lines (26) integrated into the curtain and freely mobile along the length of the curtain;
   (b) a number of support lines (12) for supporting the suspension lines such that the curtain is mobile for opening or closing of the curtain, wherein one or more of the suspension lines (26) is stretched to achieve a desired tension between two or more support lines (12); and,
   (c) one or more hooks (15) for connecting at least one suspension line to a support line (12), wherein each hook (15) has a notched shaped leg that is elastically bendable and shaped to have a first open position forming an open loop, into which the suspension line (26) can be inserted, and a second, closed position of the hook in which a single piece of the suspension line (26) can move freely along its length yet when two or more pieces of the suspension line are inserted, they are tightly affixed to the connector, thereby maintaining the desired tension.

2. The apparatus according to claim 1, wherein the hook (19) has a loop hole (19a) into which the suspension line can be inserted, having a larger area in its open position than in its closed position and being so dimensioned that on inserting several pieces of the suspension line they are subjected to a compression and/or a pinning inside the closed area.

3. An apparatus for screening off large surfaces, comprising:
   (a) at least one curtain (14) having a number of suspension lines (26) integrated into the curtain and freely mobile along the length of the curtain;
   (b) a number of support lines (12) for supporting the suspension lines such that the curtain is mobile for opening or closing of the curtain, wherein one or more of the suspension lines (26) is stretched to achieve a desired tension between two or more support lines (12); and,
   (c) one or more hooks (15) for connecting at least one suspension line to a support line (12), wherein each hook (15) has a notched shaped leg (16) that is elastically bendable and shaped to have a first open position forming an open loop, into which the suspension line (26) can be inserted, the openable loop of the hook including stretch shoes (28) on its inside between which the suspension line (26) is insertable in the open position of the loop and which line is subjected to pinning between the stretch shoes in the closed position of the loop.

4. An apparatus for screening off large surfaces, comprising:
   (a) at least one curtain (14) having a number of suspension lines (26) integrated into the curtain and freely mobile along the length of the curtain;
   (b) a number of support lines (12) for supporting the suspension lines such that the curtain is mobile for opening or closing of the curtain, wherein one or more of the suspension lines (26) is stretched to achieve a desired tension between two or more support lines (I 12); and,
   (c) one or more connectors (15) for connecting at least one suspension line to a support line, wherein said connector has at least one self-locking element arranged to lock the suspension line (26) when pulled in one direction and to free the line when pulled in the opposite direction, so that the curtain is freely mobile in said connector.

5. An apparatus for screening off large surfaces, comprising:
   (a) at least one curtain (14) having a number of suspension lines (26) integrated into the curtain and freely mobile along the length of the curtain;
   (b) a number of support lines (12) for supporting the suspension lines such that the curtain is mobile for opening or closing of the curtain, wherein one or more of the suspension lines (26) is stretched to achieve a desired tension between two or more support lines (12);

(c) one or more connectors (15) to connect at least one suspension line (26) to a support line (12);

(d) one or more stop mechanisms combined with each said connector in order to affix said connector to the suspension line (26) to thereby maintain the desired tension; and, (e) a plurality of cross fasteners (32) located at the edges of said curtain(14), wherein said cross fasteners are arranged to be affixed to both the support lines and to one of the suspension lines essentially perpendicular to the support line, thereby connecting said support line to said suspension line.

6. An apparatus for screening off large surfaces comprising:

at least one curtain (14) having a number of suspension lines (26) integrated into the curtain and freely mobile along the length of the curtain;

a number of support lines (12) for supporting the suspension lines such that the curtain is mobile for opening or closing of the curtain, wherein one or more of the suspension lines (26) is stretched to achieve a desired tension between two or more support lines (12);

one or more connectors (15) to connect at cast one suspension line (26) to a Support line (12);

one or more stop mechanisms combined with each said connector in order to affix said connector to the suspension line (26) to thereby maintain the desired tension; and, a plurality of cross fasteners (32) located at the edges of said curtain(14), wherein said cross fasteners are arranged to be affixed to both the support lines and to one of the suspension lines essentially perpendicular to the support line, thereby connecting said support line to said suspension line and wherein each cross fastener (32) includes:

steering surfaces (33) for non-linear fixation of the support line (12); and, grooves (34) essentially perpendicular to the support lines for taking up and fastening the suspension line (26) and parts of the curtain (14).

7. An apparatus for screening off large surfaces comprising:

(a) at least one curtain (14) having a number of suspension lines (26) integrated into the curtain and freely mobile along the length of the curtain;

(b) a number of support lines (12) for supporting the suspension lines such that the curtain is mobile for opening or closing of the curtain, wherein one or more of the suspension lines (26) is stretched to achieve a desired tension between two or more support lines (12);

(c) one or more connectors (15) to connect at least one suspension line (26) to a support line (12); and, (d) one or more stop mechanisms combined with each said connector in order to affix said connector to the suspension line (26) to thereby maintain the desired tension.

8. The apparatus of claim 7 wherein said stop mechanism is a clip (30) attachable to the stretched suspension line (26).

9. The apparatus of claim 7 wherein said stop mechanism is a knot attachable to the stretched suspension line (26).

10. The apparatus of claim 7 wherein said suspension line (26) is constructed of a material having both a high tensile strength and a smooth surface.

11. The apparatus of claim 10 wherein said material is a soft polymer.

12. The apparatus of claim 10 wherein said material is a low density polyethylene line reinforced with threads.

13. The apparatus of claim 10 wherein said material is a low density polyethylene line reinforced with strips of a material with higher elastic modulus.

14. Method of assembling an apparatus for screening off large surfaces, comprising at least one curtain (14), held up by a number of support lines (12) along which the curtain is mobile for opening or closing the curtain, the curtain including a number of suspension lines (26) integrated in the curtain across the support lines (12), the suspension (26) lines being freely mobile along the length of the curtain and the support lines (12), it being possible to couple them together with at least one or several of the suspension lines (26) using connectors (15)

characterized by the connectors (15) being attached to the suspension lines (26) integrated in the curtain so that they are mobile with respect to the connectors, the suspension lines (26) being stretched between at least two of the support lines (12) and affixed in a stretched condition to at least some of the connectors (15).

15. Method according to claim 14, characterized by each respective connector (15) being affixed to the suspension line (26) using an attachable clip (30) around it which prevents the connector from moving in one direction while in the opposite direction a certain mobility is allowed along the suspension line.

* * * * *